United States Patent [19]
Kingman et al.

[11] Patent Number: 6,140,392
[45] Date of Patent: Oct. 31, 2000

[54] PRINTING INKS

[75] Inventors: Kevin P. Kingman, Wixom; Rick A. Balyo, Chelsea; Michael V. Oberski, Ann Arbor, all of Mich.

[73] Assignee: Flint Ink Corporation, Ann Arbor, Mich.

[21] Appl. No.: 09/201,411

[22] Filed: Nov. 30, 1998

[51] Int. Cl.[7] .......................... C09D 11/10; C08L 33/02; C08F 20/02; C08F 212/36
[52] U.S. Cl. ................... 523/160; 525/190; 526/318.45; 526/336
[58] Field of Search ..................... 523/160, 161; 526/318.45, 329.1, 329.2, 336; 525/384, 190

[56] References Cited

U.S. PATENT DOCUMENTS

| | | |
|---|---|---|
| 3,661,619 | 5/1972 | Surland . |
| 3,803,070 | 4/1974 | Spencer et al. .......................... 524/493 |
| 3,865,772 | 2/1975 | Hulyalkar . |
| 4,045,232 | 8/1977 | Parkinson . |
| 4,255,196 | 3/1981 | Emmons et al. ...................... 106/31.66 |
| 4,327,011 | 4/1982 | Ripley et al. . |
| 4,409,077 | 10/1983 | Sakiyama et al. . |
| 4,469,826 | 9/1984 | Carlick et al. ........................... 523/339 |
| 4,518,764 | 5/1985 | Tanaka et al. . |
| 4,686,260 | 8/1987 | Lindemann et al. .................... 524/458 |
| 4,732,616 | 3/1988 | Kondo et al. ......................... 106/31.58 |
| 4,981,517 | 1/1991 | DeSanto, Jr. et al. . |
| 5,000,787 | 3/1991 | Krishnan . |
| 5,059,667 | 10/1991 | Nakamura . |
| 5,163,999 | 11/1992 | Uchida et al. ............................... 106/2 |
| 5,165,344 | 11/1992 | Matsumoto et al. .................... 101/451 |
| 5,174,815 | 12/1992 | Kondo et al. . |
| 5,328,936 | 7/1994 | Leifholtz et al. ........................... 521/65 |
| 5,338,351 | 8/1994 | Pennaz ..................................... 524/599 |
| 5,484,866 | 1/1996 | Loveless et al. . |
| 5,609,993 | 3/1997 | Hase et al. ............................... 430/302 |
| 5,616,364 | 4/1997 | Clearly et al. . |
| 5,629,375 | 5/1997 | Jenkins et al. . |
| 5,708,112 | 1/1998 | Kihara et al. . |
| 5,719,246 | 2/1998 | Taniguchi et al. ...................... 526/320 |
| 5,736,606 | 4/1998 | Yanagi et al. . |
| 5,778,789 | 7/1998 | Krishnan et al. ..................... 101/450.1 |
| 5,847,738 | 12/1998 | Tutt et al. . |
| 5,886,082 | 3/1999 | Numa et al. ............................. 524/501 |
| 5,886,125 | 3/1999 | Huybrechts . |
| 5,973,107 | 10/1999 | Margotte et al. . |
| 5,986,020 | 11/1999 | Campbell et al. . |

FOREIGN PATENT DOCUMENTS

| | | |
|---|---|---|
| 0 543 385 A1 | 5/1993 | European Pat. Off. . |
| 0 662 641 A1 | 7/1995 | European Pat. Off. . |
| 0 732 344 A2 | 9/1996 | European Pat. Off. . |
| 0 814 136 A2 | 12/1997 | European Pat. Off. . |
| 41 22 990 A1 | 1/1993 | Germany . |

OTHER PUBLICATIONS

Derwent Abstract No. XP–002132409 of JP 06219058.
PCT International Search Report dated Feb. 5, 2000.

*Primary Examiner*—Vasu Jagannathan
*Assistant Examiner*—Callie E. Shosho
*Attorney, Agent, or Firm*—Harness, Dickey & Pierce, PLC

[57] ABSTRACT

The present invention provides single fluid lithographic printing inks that include a continuous phase and a discontinuous polyol phase. The continuous phase includes an acid-functional vinyl resin. The polyol phase includes a liquid polyethylene glycol material. The invention further provides a method of making a single fluid ink composition and a process of printing using the single fluid ink of the invention with improved resistance to toning.

15 Claims, No Drawings

PRINTING INKS

FIELD OF THE INVENTION

The present invention relates to compositions of lithographic printing inks and lithographic printing methods.

BACKGROUND OF THE INVENTION

Printing inks generally include one or more vehicles and one or more colorants as principal components. Printing ink vehicles must meet a number of performance requirements that include both requirements related to the printing process, such as suitable consistency and tack for sharp, clean images, suitable length to avoid fly or mist, or proper drying characteristics, and requirements related to the printed image, such as gloss, chemical resistance, durability, or color. In general, ink vehicles include one or more materials such as vegetable oils or fatty acids, resins, and polymers that contribute to the end product properties, and may include other components such as organic solvents, water, rheology modifiers, and so on that may affect body, tack, or drying characteristics.

In lithographic printing, an inked printing plate contacts and transfers an inked image to a rubber blanket, and then the blanket contacts and transfers the image to the surface being printed. Lithographic plates are produced by treating the image areas of the plate with an oleophilic material and ensuring that the non-image areas are hydrophilic. In a typical lithographic printing process, the plate cylinder first comes in contact with dampening rollers that transfer an aqueous fountain solution to the hydrophilic non-image areas of the plate. The dampened plate then contacts an inking roller, accepting the ink only in the oleophilic image areas. The press operator must continually monitor the printing process to insure that the correct balance of the fountain solution and the ink is maintained so that the ink adheres to the printing areas, but only the printing areas, of the plate in order to produce a sharp, well-defined print.

The industry has long sought an offset printing process and associated materials that would not require a separate fountain solution. Waterless plates have been made by applying to the non-image area a silicone rubber, which has a very low surface energy and is not wetted by the ink. The silicone-modified plates are expensive, however, and require expensive, specially-cooled press equipment because the fountain solution of the traditional two-fluid method also serves as a coolant. Other efforts have been directed to producing a single-fluid lithographic ink, i.e., an ink that does not require a separate fountain solution, that can be used with the industry-standard presses and all-metal plates. Parkinson, in U.S. Pat. No. 4,045,232 (the entire disclosure of which is expressly incorporated herein by reference) describes lithographic printing and earlier efforts directed to producing a single-fluid lithographic ink and the tendency of single-fluid inks to be unstable. Parkinson notes that ink emulsions containing a solution of glycerin and salts tend to "break," with the result that the glycerin wets the inking rollers preventing good inking. Parkinson suggests an improved single-fluid ink obtained by using an additive that includes a resin treated with a concentrated mineral acid, and, optionally, a polyhydric or monohydric alcohol. Preferred polyols are glycerin, ethylene glycol, and propylene glycol. DeSanto, Jr. et al, in U.S. Pat. No. 4,981,517 (the entire disclosure of which is expressly incorporated herein by reference) describe a printing ink that is an emulsion of an oil-based phase and a water-miscible phase. The patentees allege that an emulsion containing a significant portion of water (10% to 21%) and employing phosphoric acid as a critical component has improved stability against phase separation and can be used as a single-fluid lithographic ink. The De Santo, Jr. composition further includes as a diluent and emulsion stabilizer an oil with the properties of No. 1 and No. 2 fuel oils and a polyol emulsifier, of which glycerin and ethylene glycol are the only examples provided.

Nonetheless, due to various drawbacks of the single-fluid lithographic inks that have previously been proposed, including the limited stability and poor definition and toning already mentioned, the industry standard continues to be a dual-fluid lithographic ink that includes an ink component and a separate fountain solution component.

Applicants have now discovered that an ink composition that includes a polyol phase dispersed or emulsified in an acid-functional vinyl resin vehicle phase overcomes these problems in a single-fluid lithographic ink.

SUMMARY OF THE INVENTION

The invention provides a single fluid lithographic printing ink composition that includes a hydrophobic phase and a polyol phase. The hydrophobic phase comprises at least a vinyl resin having carboxyl functionality. The term "vinyl resin" when used in conjunction with the present invention includes polymers prepared by chain reaction polymerization, or addition polymerization, through carbon—carbon double bonds, using vinyl monomers such as acrylic and methacrylic monomers, vinyl aromatic monomers including styrene, and monomers copolymerizable with these. The vinyl polymers of the invention may be branched by including in the polymerization reaction monomers that have two reaction sites. When the vinyl polymer is branched, it nonetheless remains usefully soluble. By "soluble" it is meant that the polymer can be diluted with one or more solvents. (By contrast, polymers may be crosslinked into insoluble, three-dimensional network structures that are only swelled by solvents.) The branched vinyl resins of the invention unexpectedly retain solubility in spite of significant branching.

The invention further provides a method of making an ink composition having a phase that includes a vinyl resin having carboxyl functionality and a polyol phase. In another aspect of the invention, the vinyl-based printing ink is modified by the addition of another vehicle resin. The invention also provides a process of printing using the single fluid ink of the invention.

The invention has unexpectedly provided stable inks that can be used as single fluid inks with improved resistance to toning.

DETAILED DESCRIPTION OF THE INVENTION

The invention provides a single fluid lithographic printing ink composition that includes a hydrophobic phase and a polyol phase. The hydrophobic phase comprises at least a vinyl resin having carboxyl functionality. The term "vinyl resin" when used in conjunction with the present invention includes polymers prepared by chain reaction polymerization, or addition polymerization, through carbon—carbon double bonds, using vinyl monomers and monomers copolymerizable with vinyl monomers. Typical vinyl monomers include, without limitation, vinyl esters, acrylic and methacrylic monomers, and vinyl aromatic monomers including styrene. The vinyl polymers of the invention may be branched by including in the polymerization reaction monomers that have two reaction sites. When the vinyl polymer is branched, it nonetheless remains usefully soluble. By "soluble" it is meant that the polymer can be diluted with one or more solvents. (By contrast, polymers may be crosslinked into insoluble, three-dimensional network structures that are only be swelled by solvents.) The branched vinyl resins of the invention unexpectedly retain solvent dilutability in spite of significant branching.

The carboxyl-functional vinyl polymers of the invention may be prepared by polymerization of a monomer mixture that includes at least one acid-functional monomer or at least one monomer that has a group that is converted to an acid group following polymerization, such as an anhydride group. Examples of acid-functional or anhydride-functional monomers include, without limitation, α,β-ethylenically unsaturated monocarboxylic acids containing 3 to 5 carbon atoms such as acrylic, methacrylic, and crotonic acids; α,β-ethylenically unsaturated dicarboxylic acids containing 4 to 6 carbon atoms and the anhydrides and monoesters those acids, such as maleic anhydride, and fumaric acid; and acid-functional derivatives of copolymerizable monomers, such as the hydroxylethyl acrylate half-ester of succinic acid.

It is preferred to include an acid-functional monomer such as acrylic acid, methacrylic acid, or crotonic acid, or an anhydride monomer such as maleic anhydride or itaconic anhydride that may be hydrated after polymerization to generate acid groups. It is preferred for the acid-functional vinyl polymer to have an acid number of at least about 3 mg KOH per gram nonvolatile, preferably an acid number of from about 6 to about 30 mg KOH per gram nonvolatile, and more preferably an acid number of from about 8 to about 25 mg KOH per gram nonvolatile, based upon the nonvolatile weight of the vinyl polymer.

In a preferred embodiment, the acid-functional polymers of the invention are significantly branched. The inks of the invention include a vinyl polymer that is branched but usefully soluble. The branched vinyl polymers of the invention may be diluted, rather than swollen, by addition of solvent. The branching may be accomplished by at least two methods. In a first method, a monomer with two or more polymerizable double bonds is included in the polymerization reaction. In a second method, a pair of ethylenically unsaturated monomers, each of which has in addition to the polymerizable double bond at least one additional functionality reactive with the additional functionality on the other monomer, are included in the monomer mixture being polymerized. Preferably, the reaction of the additional functional groups takes place during the polymerization reaction, although this is not seen as critical in the formation of a polymer according to the invention and the reaction of the additional functional groups may be carried out partially or wholly before or after polymerization. A variety of such pairs of mutually reactive groups are possible. Illustrative examples of such pairs of reactive groups include, without limitation, epoxide and carboxyl groups, amine and carboxyl groups, epoxide and amine groups, epoxide and anhydride groups, amine and anhydride groups, hydroxyl and carboxyl or anhydride groups, amine and acid chloride groups, alkylene-imine and carboxyl groups, organoalkoxysilane and carboxyl groups, isocyanate and hydroxyl groups, cyclic carbonate and amine groups, isocyanate and amine groups, and so on. When carboxyl or anhydride groups are included as one of the reactive groups, they are used in a sufficient excess to provide the required carboxyl functionality in the vinyl resin. Specific examples of such monomers include, without limitation, glycidyl (meth)acrylate with (meth) acrylic acid, N-alkoxymethylated acrylamides (which react with themselves) such as N-isobutoxymethylated acrylamide, gamma-methacryloxytrialkoxysilane (which reacts with itself), and combinations thereof. In connection with the description of this invention, the term "(meth) acrylate" will be used to refer to both the acrylate and the methacrylate esters and the term "(meth)acrylic" will be used to refer to both the acrylic and the methacrylic compounds.

Preferably, the vinyl resin of the invention is polymerized using at least one monomer having two or more polymerizable ethylenically unsaturated bonds, and particularly preferably from two to about four polymerizable ethylenically unsaturated bonds. Illustrative examples of monomers having two or more ethylenically unsaturated moieties include, without limitation, (meth)acrylate esters of polyols such as 1,4-butanediol di(meth)acrylate, 1.6-hexanediol di(meth) acrylate, neopentyl glycol di(meth)acrylate, trimethylol propane tri(meth)acrylate, tetramethylol methane tetra(meth) acrylate, pentaerythritol tetra(meth)acrylate, dipentaerythritol penta(meth)acrylate, dipentaerythritol hexa(meth)acrylate, alkylene glycol di(meth)acrylates and polyalkylene glycol di(meth)acrylates, such as ethylene glycol di(meth)acrylate, butylene glycol di(meth)acrylate, diethylene glycol di(meth)acrylate, triethylene glycol di(meth)acrylate, and polyethylene glycol di(meth)acrylate; divinylbenzene, allyl methacrylate, diallyl phthalate, diallyl terephthalate, and the like, singly or in combinations of two or more. Of these, divinylbenzene, butylene glycol dimethacrylate, butanediol dimethacrylate, trimethylolpropane triacrylate, and pentaerythritol tetra-acrylate are highly preferred, and divinylbenzene is still more highly preferred.

Preferably, the branched vinyl polymer is polymerized using at least about 0.008 equivalents per 100 grams of monomer polymerized of at least one monomer having at least two ethylenically unsaturated polymerizable bonds, or 0.004 equivalents per 100 grams of monomer polymerized of each of two monomers having mutually reactive groups in addition to an ethylenically unsaturated polymerizable bond. Preferably, the branched vinyl polymer is polymerized using from about 0.012 to about 0.08 equivalents, and more preferably from about 0.016 to about 0.064 equivalents per 100 grams of monomer polymerized of the polyfunctional monomer or monomers having at least two ethylenically unsaturated polymerizable bonds or of the pair of monomers having one polymerization bond and one additional mutually reactive group.

The polyfunctional monomer or monomers preferably have from two to four ethylenically unsaturated polymerizable bonds, and more preferably two ethylenically unsaturated polymerizable bonds. In one embodiment it is preferred for the branched vinyl resin to be prepared by polymerizing a mixture of monomers that includes from about 0.5% to about 6%, more preferably from about 1.2% to about 6%, yet more preferably from about 1.2% to about 4%, and even more preferably from about 1.5% to about 3.25% divinylbenzene based on the total weight of the monomers polymerized. (Commercial grades of divinylbenzene include mono-functional and/or non-functional material. The amount of the commercial material needed to provide the indicated percentages must be calculated. For example, 5% by weight of a material that is 80% by weight divinylbenzene/20% mono-functional monomers would provide 4% by weight of the divinylbenzene fraction.)

The optimum amount of (1) divinylbenzene or other monomer having at least two polymerizable ethylenically unsaturated bond or (2) pair of monomers having polymerizable group and additional, mutually-reactive groups that are included in the polymerization mixture depends to some extent upon the particular reaction conditions, such as the rate of addition of monomers during polymerization, the solvency of the polymer being formed in the reaction medium chosen, the amount of monomers relative to the reaction medium, the half-life of the initiator chosen at the reaction temperature and the amount of initiator by weight of the monomers, and may be determined by straightforward testing.

Other monomers that may be polymerized along with the polyfunctional monomers and the acid-functional monomers (or monomers with groups that can later be converted to acid groups) include, without limitation, esters of α,β-ethylenically unsaturated monocarboxylic acids containing 3 to 5 carbon atoms such as esters of acrylic, methacrylic, and crotonic acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The selection of monomers is made on the basis of various factors commonly considered in making ink varnishes, including the desired glass transition temperature and the desired dilutability of the resulting polymer in the solvent or solvent system of the ink composition.

The preferred vinyl polymers may be prepared by using conventional techniques, preferably free radical polymerization in a semi-batch process. For instance, the monomers, initiator(s), and any chain transfer agent may be fed at a controlled rate into a suitable heated reactor charged with solvent in a semi-batch process. Typical free radical sources are organic peroxides, including dialkyl peroxides, such as di-tert-butyl peroxide and dicumyl peroxide, peroxyesters, such as tert-butyl peroxy 2-ethylhexanoate and tert-butyl peroxy pivalate; peroxy carbonates and peroxydicarbonates, such as tert-butyl peroxy isopropyl carbonate, di-2-ethylhexyl peroxydicarbonate and dicyclohexyl peroxydicarbonate; diacyl peroxides, such as dibenzoyl peroxide and dilauroyl peroxide; hydroperoxides, such as cumene hydroperoxide and tert-butyl hydroperoxide; ketone peroxides, such as cyclohexanone peroxide and methylisobutyl ketone peroxide; and peroxyketals, such as 1,1-bis(tert-butyl peroxy)-3,5,5-trimethylcyclohexane and 1,1-bis(tert-butyl peroxy)cyclohexane; as well as azo compounds such as 2,2'-azobis(2-methylbutanenitrile), 2,2'-azobis(2-methyl) propionitrile, and 1,1'-azobis(cyclohexanecarbonitrile).

Organic peroxides are preferred. Particularly preferred is tert-butyl peroxy isopropyl carbonate. Chain transfer agents may also be used in the polymerization. Typical chain transfer agents are mercaptans such as octyl mercaptan, n- or tert-dodecyl mercaptan, thiosalicylic acid, mercaptocarboxylic acids such as mercaptoacetic acid and mercaptopropionic acid and their esters, and mercaptoethanol; halogenated compounds; and dimeric alpha-methyl styrene. Preferably, no chain transfer agent is included because of odor and other known drawbacks. The particular initiator and amount of initiator used depends upon factors known to the person skilled in the art, such as the reaction temperature, the amount and type of solvent (in the case of a solution polymerization), the half-life of the initiator, and so on.

The addition polymerization is usually carried out in solution at temperatures from about 20° C. to about 300° C., preferably from about 150° C. to about 200° C., more preferably from about 160° C. to about 165° C. Preferably, the polymerization is carried out with approximately the same reaction temperature and using the same initiator(s) throughout. The initiator should be chosen so its half-life at the reaction temperature is preferably no more than about thirty minutes, particularly preferably no more than about five minutes, and yet more preferably no more than about two minutes. Particularly preferred are initiators having a half-life of less than about one minute at a temperature of from about 150° C. to about 200° C. In general, more of the branching monomer can be included when the initiator half-life is shorter and/or when more initiator is used. The vinyl polymer vehicles of the invention preferably have little or no residual (unreacted) monomer content. In particular, the vinyl vehicles are preferably substantially free of residual monomer, i.e., have less than about 0.5% residual monomer, and even more preferably less than about 0.1% residual monomer by weight, based on the total weight of the monomers being polymerized.

In a semi-batch process, the monomer and initiator is added to the polymerization reactor over a period of time, preferably at a constant rate. Typically, the add times are from about 1 to about 10 hours, and add times of from about three to about five hours are common. Longer add times typically produce lower number average molecular weights. Lower number average molecular weights may also be produced by increasing the ratio of solvent to monomer or by using a stronger solvent for the resulting polymer.

In general, the branched vinyl polymer of the invention has a low number average molecular weight and a broad polydispersity. The number average molecular weight and weight average molecular weight of a vinyl resin according to the invention can be determined by gel permeation chromatography using polystyrene standards, which are available for up to 6 million weight average molecular weight, according to well-accepted methods. Polydispersity is defined as the ratio of $M_w/M_n$. In a preferred embodiment, the vinyl polymer has a number average molecular weight ($M_n$) of at least about 1000, and more preferably at least about 2000. The number average molecular weight is also preferably less than about 15,000, more preferably less than about 10,000, and even more preferably less than about 8500. A preferred range for $M_n$ is from about 1000 to about 10,000, a more preferred range for $M_n$ is from about 2000 to about 8500, and an even more preferred range is from about 4000 to about 8000. The weight average molecular weight should be at least about 30,000, preferably at least about 100,000. The weight average molecular weight ($M_w$) is preferably up to about 60 million, based upon a GPC determination using an available standard having 6 million weight average molecular weight. A preferred range for $M_w$ is from about 30,000 to about 55 million, a more preferred range for $M_w$ is from about 100,000 to about 1 million, and a still more preferred range is from about 100,000 to about 300,000. Resins having ultra-high molecular weight shoulders (above about 45 million), which can be seen by GPC, are preferably avoided for the $M_w$ range of from about 100,000 to about 300,000. The polydispersity, or ratio of $M_w/M_n$, may be up to about 10,000, preferably up to about 1000. The polydispersity is preferably at least about 15, particularly preferably at least about 50. The polydispersity preferably falls in the range of from about 15 to about 1000, and more preferably it falls in a range of from about 50 to about 800.

The theoretical glass transition temperature can be adjusted according to methods well-known in the art through selection and apportionment of the commoners. In a preferred embodiment, the theoretical $T_g$ is above room temperature, and preferably the theoretical $T_g$ is at least about 60° C., more preferably at least about 70° C. The methods and compositions of the present invention preferably employ vinyl polymers having a $T_g$ of from about 50° C. to about 125° C., more preferably from about 60° C. to about 100° C., and even more preferably from about 70° C. to about 90° C.

In one embodiment of the invention, the acid-functional vinyl polymer, which may be a branched vinyl polymer, is combined with other resins in the ink composition. Examples of suitable other resins that may be combined with the acid-functional vinyl polymer include, without limitation, polyester and alkyd resins, phenolic resins, rosins, cellulosics, and derivatives of these such as rosin-modified phenolics, phenolic-modified rosins, hydrocarbon-modified rosins, maleic modified rosin, fumaric modified rosins; hydrocarbon resins, other acrylic or vinyl resins, polyamide resins, and so on. Such resins or polymers may be included in amounts of up to about 6 parts by weight to about 1 part by weight of the acid-functional vinyl polymer of the invention, based upon the nonvolatile weights of the resins.

In addition to the acid-functional vinyl resin and any optional second resin, the ink compositions of the invention preferably include one or more solvents. In a preferred embodiment of the invention, the branched vinyl resin forms a solution or apparent solution having no apparent turbidity in the solvent or solvents of the ink formulation. The particular solvents and amount of solvent included is determined by the ink viscosity, body, and tack desired. In general, non-oxygenated solvents or solvents with low Kauri-butanol (KB) values are used for inks that will be in contact with rubber parts such as rubber rollers during the lithographic process, to avoid affecting the rubber. Suitable solvents for inks that will contact rubber parts include, without limitation, aliphatic hydrocarbons such as petroleum distillate fractions and normal and iso paraffinic solvents with limited aromatic character. For example, petroleum middle distillate fractions such as those available under the tradename Magie Sol, available from Magie Bros. Oil Company, a subsidiary of Pennsylvania Refining Company, Franklin Park, Ill., under the tradename ExxPrint, available from Exxon Chemical Co., Houston, Tex., and from Golden Bear Oil Specialties, Oildale, Calif., Total Petroleum Inc., Denver, Colo., and Calumet Lubricants Co., Indianapolis, Ind. may be used. In addition or alternatively, soybean oil or other vegetable oils may be included.

When non-oxygenated solvents such as these are used, it is generally necessary to include a sufficient amount of at least one monomer having a substantial affinity for aliphatic solvents in order to obtain the desired solvency of the preferred branched vinyl polymer. In general, acrylic ester monomers having at least six carbons in the alcohol portion of the ester or styrene or alkylated styrene, such as tert-butyl styrene, may be included in the polymerized monomers for this purpose. In a preferred embodiment, an ink composition with non-oxygenated solvents includes a branched vinyl resin polymerized from a monomer mixture including at least about 20%, preferably from about 20% to about 40%, and more preferably from about 20% to about 25% of a monomer that promotes aliphatic solubility such as stearyl methacrylate or t-butyl styrene, with stearyl methacrylate being a preferred such monomer. It is also preferred to include at least about 55% percent styrene, preferably from about 55% to about 80% styrene, and more preferably from about 60% to about 70% styrene. Methyl methacrylate or other monomers may also be used to reduce solvent tolerance in aliphatic solvent, if desired. All percentages are by weight, based upon the total weight of the monomer mixture polymerized. Among preferred monomer compositions for vinyl polymers for lithographic inks are those including a (meth)acrylic ester of an alcohol having 8–20 carbon atoms such as stearyl methacrylate, styrene, divinylbenzene, and (meth)acrylic acid. In a preferred embodiment, a branched vinyl for a lithographic printing ink is made with from about 15, preferably about 20, to about 30, preferably about 25, weight percent of a (meth)acrylic ester of an alcohol having 8–20 carbon atoms, especially stearyl methacrylate; from about 50, preferably about 60, to about 80, preferably about 75, weight percent of a styrenic monomer, especially styrene itself; an amount of divinylbenzene as indicated above; and from about 0.5, preferably about 2.5, to about 5, preferably about 4, weight percent of acrylic acid or, more preferably, of methacrylic acid.

Preferably, the solvent or solvent mixture will have a boiling point of at least about 100° C. and preferably not more than about 550° C. Offset printing inks may use solvents with boiling point above about 200° C. News inks usually are formulated with from about 20 to about 85 percent by weight of solvents such as mineral oils, vegetable oils, and high boiling petroleum distillates. The amount of solvent also varies according to the type of ink composition (that is, whether the ink is for newsprint, heatset, sheetfed, etc.), the specific solvents used, and other factors known in the art. Typically the solvent content for lithographic inks is up to about 60%, which may include oils as part of the solvent package. Usually, at least about 35% solvent is present in lithographic ink. When used to formulate the preferred ink compositions of the invention, these varnishes or vehicles, including the branched vinyl resins, are typically clear, apparent solutions.

The ink compositions of the invention will usually include one or more pigments. The number and kinds of pigments will depend upon the kind of ink being formulated. News ink compositions typically will include only one or only a few pigments, such as carbon black, while gravure inks may include a more complicated pigment package and may be formulated in many colors, including colors with special effects such as pearlescence or metallic effect. Lithographic printing inks are typically used in four colors—magenta, yellow, black, and cyan, and may be formulated for pearlescence or metallic effect. Any of the customary inorganic and organic pigments may be used in the ink compositions of the present invention. Alternatively, the compositions of the invention may be used as overprint lacquers or varnishes. The overprint lacquers (air drying) or varnishes (curing) are intended to be clear or transparent and thus opaque pigments are not included.

Lithographic ink compositions according to the invention are formulated as single-fluid inks having an oil-based continuous phase that contains the acid-functional vinyl vehicle and a polyol discontinuous phase that contains a liquid polyol. The vinyl polymer phase is relatively stable toward the polyol phase. The stability is such that the two phases do not separate in the fountain. During application of the ink, however, the emulsion breaks and the polyol comes to the surface, wetting out the areas of the plate that are not to receive ink. Inks that are stable in the fountain but break quickly to separate on the plate print cleanly without toning and provide consistent transfer characteristics. Proper stability also may depend upon the particular acid-functional vinyl polymer and the particular polyol chosen. The acid number and molecular weight may be adjusted to provide the desired stability. Higher acid number vinyl resins can be used in lower amounts, but the acid number cannot be excessively high or else the vinyl polymer will not be sufficiently soluble in the hydrocarbon solvent. In general, it is believed that an increase in acid number of the acid-functional vinyl resin should be accompanied by a decrease in the amount of such resin included in the hydrophobic phase.

Polyethylene glycol oligomers such as diethylene glycol, triethylene glycol, and tetraethylene glycol, as well as ethylene glycol, propylene glycol, and dipropylene glycol, are examples of liquid polyols that are preferred for the polyol phase of the single-fluid ink of the invention. The polyol phase may, of course, include mixtures of different liquid polyols. In general, lower acid number vinyl or acrylic polymers are used with higher molecular weight polyols. The polyol phase may include further materials. A weak acid such as citric acid, tartaric acid, or tannic acid, or a weak base such as triethanolamine, may be included in an amount of from about 0.01 weight percent up to about 2 weight percent of the ink composition. Certain salts such as magnesium nitrate may be included in amounts of from about 0.01 weight percent to about 0.5 weight percent, preferably from about 0.08 to about 1.5 weight percent, based on the weight of the ink composition, to help protect the plate and extend the life of the plate. A wetting agent, such as polyvinylpyrolidone, may be added to aid in wetting of the plate. From about 0.5 weight percent to about 1.5 weight percent of the polyvinylpyrrolidone is included, based on the weight of the ink composition.

Single-fluid inks may be formulated with from about 5% to about 50%, preferably from about 10% to about 35%, and particularly preferably from about 20% to about 30% of polyol phase by weight based on the total weight of the ink composition. Unless another means for cooling is provided, there is preferably a sufficient amount of polyol in the ink composition to keep the plate at a workably cool temperature. The amount of polyol phase necessary to achieve good toning and printing results depends upon the kind of plate being used and may be determined by straightforward testing. Up to about 4 or 5% by weight of water may be included in the polyol phase mixture to aid in dissolving or homogenizing the ingredients of the polyol phase.

It will be appreciated by the skilled artisan that other additives known in the art that may be included in the ink compositions of the invention, so long as such additives do not significantly detract from the benefits of the present invention. Illustrative examples of these include, without limitation, pour point depressants, surfactants, wetting agents, waxes, emulsifying agents and dispersing agents, defoamers, antioxidants, UV absorbers, dryers (e.g., for formulations containing vegetable oils), flow agents and other rheology modifiers, gloss enhancers, and anti-settling agents. When included, additives are typically included in amounts of at least about 0.001% of the ink composition, and may be included in amount of about 7% by weight or more of the ink composition.

The compositions of the invention are particularly suited for use in lithographic applications, including, without limitation, as heatset inks, news inks, and sheetfed inks. Offset printing processes in which the inks of the invention may be used are well-known in the art and are described in many publications.

The invention is illustrated by the following examples. The examples are merely illustrative and do not in any way limit the scope of the invention as described and claimed. All parts are parts by weight unless otherwise noted.

EXAMPLES

Example 1

Preparation of a Vinyl Varnish

An amount of 44.19 parts by weight of Total 220 (a petroleum middle distillate fraction available from Total Petroleum, Inc.) is charged to a glass reactor equipped with stirrer, nitrogen inlet, total reflux condenser, and monomer inlet. The solvent is heated to 160° C. with stirring under a blanket of nitrogen. A monomer mixture of 36.01 parts by weight styrene, 12.27 parts by weight stearyl methacrylate, 2.62 parts by weight divinylbenzene, 1.89 parts by weight methacrylic acid, and 2.79 parts by weight t-butyl peroxy isopropyl carbonate (75% solution in mineral spirits) is added to the reactor over a period of three hours. After the monomer addition is complete, 0.23 parts by weight of t-butyl peroxy isopropyl carbonate is added over a period of fifteen minutes. The temperature is held at 160° C. for an additional two hours to allow for complete conversion of the monomer to polymer. The measured amount of non-volatile matter (NVM) is 55%. The percent conversion, measured as NVM divided by the percent of the total weight of monomers, is 100.1. The acid number on solution is 12.0 mg KOH per gram. The viscosity is 30 Stokes (bubble tube, 54.4° C.). The solvent tolerance is 230% and the NVM at cloud point is 16.7%.

Example 2

Preparation of a Vinyl Varnish

An amount of 44.22 parts by weight of Golden Bear 1108 (a petroleum middle distillate fraction available from Golden Bear Oil Specialties) is charged to a reaction flask equipped with stirrer, nitrogen inlet, total reflux condenser, and monomer inlet. The solvent was heated to 145° C. with stirring. A monomer mixture of 33.86 parts by weight styrene, 12.6 parts by weight stearyl methacrylate, 3.1 parts by weight n-butyl acrylate, 1.31 parts by weight divinylbenzene HP (80% divinylbenzene), 1.89 parts by weight methacrylic acid, and 2.89 parts by weight t-butyl peroxy isopropyl carbonate is added to the reaction flask over a period of 3 hours. After the monomer addition is complete, 0.23 parts by weight of t-butyl peroxy isopropyl carbonate is added to the flask over a period of 15 minutes. The temperature is held at 145° C. for an additional two hours to allow for complete conversion of the monomer to polymer. The measured amount of non-volatile matter (NVM) is 56%. The percent conversion, measured as the percent of the total weight of monomers converted to non-volatile matter is 101.5. The acid number on solution is 12.0 mg KOH per gram. The viscosity is 47 Stokes (bubble tube, 54.4° C.). The solvent tolerance is greater than 1400% and the NVM at cloud point is less than 3.7% (i.e., no cloud point is observed yet at this dilution).

Example 3

Preparation of a Vinyl Varnish

An amount of 461.2 parts by weight of Calumet 600 (a petroleum middle distillate fraction available from Calumet Lubricants Co.) is charged to a glass reactor equipped with stirrer, nitrogen inlet, total reflux condenser, and monomer inlet. The solvent is heated to 145° C. with stirring under a blanket of nitrogen. A monomer mixture of 350.1 parts by weight styrene, 131.3 parts by weight stearyl methacrylate, 42.1 parts by weight n-butyl acrylate, 17.1 parts by weight divinylbenzene HP, 9.8 parts by weight methacrylic acid, and 29.2 parts by weight t-butyl peroxy isopropyl carbonate (75% solution in mineral spirits) is added to the reactor over a period of three hours. After the monomer addition is complete, 2.4 parts by weight of t-butyl peroxy isopropyl carbonate is added over a period of fifteen minutes. The temperature is held at 145° C. for an additional two hours to allow for complete conversion of the monomer to polymer. The measured amount of non-volatile matter (NVM) is 56%. The percent conversion, measured as NVM divided by the percent of the total weight of monomers, is 101.6. The acid number on solution is 6.3 mg KOH per gram. The viscosity is 35 Stokes (bubble tube, 54.4° C.). The solvent tolerance is 80% and the NVM at cloud point is 31.0%.

Example 4

Preparation of a Vinyl Varnish

An amount of 1548.1 parts by weight of ExxPrint 283D (a petroleum middle distillate fraction available from Exxon Chemical Co.) is charged to a glass reactor equipped with stirrer, nitrogen inlet, total reflux condenser, and monomer inlet. The solvent is heated to 145° C. with stirring under a blanket of nitrogen. A monomer mixture of 1248.5 parts by weight styrene, 429.6 parts by weight stearyl methacrylate, 102.8 parts by weight n-butyl acrylate, 68.9 parts by weight divinylbenzene HP, and 85.7 parts by weight t-butyl peroxy isopropyl carbonate (75% solution in mineral spirits) is added to the reactor over a period of three hours. After the monomer addition is complete, 16.4 parts by weight of t-butyl peroxy isopropyl carbonate is added over a period of fifteen minutes. The temperature is held at 145° C. for an additional two hours to allow for complete conversion of the monomer to polymer. The measured amount of non-volatile matter (NVM) is 56%. The percent conversion, measured as NVM divided by the percent of the total weight of monomers, is 101.4. The viscosity is 26 Stokes (bubble tube, 54.4° C.). The solvent tolerance is 160% and the NVM at cloud point is 21.5%.

Example 5

Preparation of a Heatset Single Fluid Printing Ink According to the Invention 58.0 grams of the following Mixture 5A is added to 142.0 grams of the following Mixture 5B with stirring. The ink composition is mixed for 20 minutes on a dispersator, maintaining a vortex and holding the temperature under 140° F. The ink composition has a single fall time Laray of 14 to 17 seconds for 500 grams at 30° C. When used in a single-fluid heatset lithographic printing process, the ink prints without toning.

Mixture 5A:

Mix in a glass beaker until clear 181.0 grams of diethylene glycol, 8.0 grams of RO water, 0.4 grams of citric acid, and 0.4 grams of magnesium nitrate. Add 191.2 grams of diethylene glycol and mix until homogenous.

Mixture 5B:

Mix, using a high-speed mixer, 46.0 grams of the vinyl vehicle of Example 1, 4.0 grams of Blue Flush 12-FH-320 (available from CDR Corporation, Elizabethtown, Ky.) 1.0 gram technical grade Soy oil (available from Cargill, Chicago, Ill.) and 0.6 grams of an antioxidant. While mixing, add 34.4 grams of a hydrocarbon resin solution (60% LX-2600 in EXX-Print 283D, available from Neville), 27.0 grams of a carbon black (CSX-156 available from Cabot Corp.), and 1.0 gram of a polytetrafluoroethylene wax (Pinnacle 9500D, available from Carrol Scientific). Mix at a high speed for 30 minutes at 300° F. Slow the mixing speed and add 27.0 grams of EXX-Print 588D (available from Exxon). Mill the premix in a shot mill to a suitable grind. Mixture B has a Laray viscosity of 180 to 240 poise and a Laray yield of 800 to 1200 (according to test method ASTM D4040: Power Law-3 k, 1.5 k, 0.7 k, 0.3 k). Mixture 5B is tested on the Inkometer for one minute at 1200 rpm for a measured result of 25 to 29 units.

Example 6

Preparation of a News Ink Single Fluid Printing Ink According to the Invention

Mixture 6A:

A mixture of 87.0 grams of diethylene glycol, 12.7 grams of glycerin, 0.15 gram of citric acid monohydrate, and 0.15 grams of magnesium nitrate hexahydrate are stirred with heat (at 130–140° F.) until homogenous.

Mixture 6B:

A blend of 40.2 grams of a gilsonite varnish, 0.8 gram oronite, 17.9 grams MSO solvent (available from Calumet), and 41.1 grams of a carbon black (CSX-320 from Cabot Corp.) were mixed with shear to a 4.0 on the Hegman grind gauge, and then ground in a shot mill to a grind on a 2 mil gauge of at least 0/10. The Laray viscosity at 30° C. is measured as 296 poise for a drop with 2000 grams of added weight and as 1332 poise for a drop with 200 grams of added weight (±25% accuracy) and gives an inkometer reading at 90° F. (32° C.) for 1 minute at 400 rpm followed immediately by 1 minute at 1200 rpm of 5–10 units.

News Ink:

The news ink is prepared by mixing together 32.4 grams of the mixture B and 37.6 grams of Example 2 to obtain a Mixture 6C having an inkometer reading at 90° F. (32° C.) for 1 minute at 400 rpm followed immediately by 1 minute at 1200 rpm of 18.8 units, a Laray viscosity at 30° C. of 375 poise for a drop with 2000 grams of added weight and 565 poise for a drop with 200 grams of added weight (±25% accuracy), and a viscosity as measured according to ASTM D4040 (power law 2000, 1500, 1000, 500) at 2500 $s^{-1}$ of 285 poise with a pseudo yield of 1709 dynes per $cm^2$. To obtain the ink, 30.0 grams of Mixture 6A is added to Mixture 6C with mixing at 3000 rpm for 10 minutes. The resulting ink has a single fall time Laray at 30° C. of 21 seconds for 500 grams. The ink does not exhibit toning when using in a single-fluid lithographic printing process.

Examples 7–12 and Comparative Examples A–D

The Examples 7–12 and Comparative Examples were prepared by the method of Example 5 and tested for stability and toning in a lithographic printing process.

| Material | Example 7 | Example 8 | Example 9 | Example 10 | Example 11 | Example 12 |
|---|---|---|---|---|---|---|
| Acid-functional vinyl resin of Example 1 | 8 | 18 | 37 | | | |
| Acid-functional vinyl resin of Example 3 | | | | 8 | 18 | 37 |
| Hydrocarbon varnish solution[1] | 32.5 | 22.5 | | 32.5 | 22.5 | |
| Uncoated black base[2] | 30 | 30 | 30 | 30 | 30 | 30 |
| Total 220 | 0.5 | 0.5 | 4 | 0.5 | 0.5 | 4 |
| Diethylene glycol mix[3] | 29 | 29 | 29 | 29 | 29 | 29 |
| Fountain Break Time (seconds) | >600 | >600 | >600 | >600 | >600 | >600 |
| Tone | Clean | Clean | Clean | Clean | Clean | Clean |

[1]LX2600 (available from Neville Chemical Co., Pittsburgh, PA.), 60% in ExxPrint 283D
[2]45% carbon black pigment in 51% of the hydrocarbon varnish solution, 3% soy oil, 1% of antioxidant
[3]Mixture 5A of Example 5.

| Material | Comparative Example A | Comparative Example B | Comparative Example C | Comparative Example D |
|---|---|---|---|---|
| Vinyl resin of Example 4 | 8 | 18 | 37 | |
| Rosin modified hydrocarbon solution[4] (acid number of 4.8 on solution) | | | | 37 |
| Hydrocarbon varnish solution[1] | 32.5 | 22.5 | | |
| Uncoated black base[2] | 30 | 30 | 30 | 30 |
| Total 220 | 0.5 | 0.5 | 4 | 4 |
| Diethylene glycol mix[3] | 29 | 29 | 29 | 29 |
| Fountain Break Time (seconds) | 200 | 60 | 5 | >600 |
| Tone | (not stable enough to run) | (not stable enough to run) | (not stable enough to run) | Immediate (tones on first sheet) |

[4]55% RP 369 (available from Westvaco, St. Louis, MO) in EXX-Print 283D.

The invention has been described in detail with reference to preferred embodiments thereof. It should be understood, however, that variations and modifications can be made within the spirit and scope of the invention and of the following claims.

What is claimed is:

1. A lithographic ink composition, comprising
   a continuous phase comprising an acid-functional vinyl resin and
   a polyol phase comprising a liquid polyol.

2. A lithographic ink composition according to claim 1, wherein the liquid polyol is selected from the group consisting of ethylene glycol, diethylene glycol, triethylene glycol, tetraethylene glycol, propylene glycol, dipropylene glycol, and mixtures thereof.

3. A lithographic ink composition according to claim 1, wherein the ink composition includes from about 5% to about 50% of the polyol phase by weight.

4. A lithographic ink composition according to claim 1, wherein the ink composition includes from about 10% to about 35% of the polyol phase by weight.

5. A lithographic ink composition according to claim 1, wherein the ink composition includes from about 20% to about 30% of the polyol phase by weight.

6. A lithographic ink composition according to claim 1, wherein the polyol phase includes a weak acid or a weak base.

7. A lithographic ink composition according to claim 1, wherein the polyol phase include magnesium nitrate.

8. A lithographic ink composition according to claim 1, wherein the polyol phase is nonaqueous.

9. A lithographic ink composition according to claim 1, wherein the vinyl polymer has as acid number of at least about 3 mg KOH per gram nonvolatile.

10. A lithographic ink composition according to claim 1, wherein the vinyl polymer has as acid number of from about 3 to about 30 mg KOH per gram nonvolatile.

11. A lithographic ink composition according to claim 1, wherein the vinyl polymer has as acid number of from about 8 to about 25 mg KOH per gram nonvolatile.

12. A lithographic ink composition according to claim 1, wherein the continuous phase further includes a member selected from the group consisting of polyester resins, hydrocarbon resins, alkyd resins, phenolic resins, rosins, cellulosic resins, and modifications thereof, and mixtures thereof.

13. A lithographic ink composition, comprising
   a continuous phase comprising a branched, acid-functional vinyl resin and
   a polyol phase comprising a liquid polyol.

14. A lithographic ink composition according to claim 13, wherein the vinyl resin has a number average molecular weight of between about 1000 and about 15,000 and a weight average molecular weight of at least about 100,000.

15. A method of making a lithographic printing ink, comprising a step of combining a first composition comprising an acid-functional vinyl resin and a second composition comprising a liquid polyol, whereby a printing ink is formed having as a continuous phase the first composition and as a discontinuous phase the second composition.

* * * * *

UNITED STATES PATENT AND TRADEMARK OFFICE
CERTIFICATE OF CORRECTION

PATENT NO. : 6,140,392
DATED : October 31, 2000
INVENTOR(S) : Kevin P. Kingman et al.

It is certified that error appears in the above-identified patent and that said Letters Patent is hereby corrected as shown below:

<u>Title page,</u>
FOREIGN PATENT DOCUMENTS,
insert -- GB 2113701  8/10/83  Britain --.

<u>Column 9,</u>
Line 42, "polyvinylpyrolidone" should be -- polyvinylpyrrolidone --.
Line 44, "polyvinylpyrollidone" should be -- polyvinylpyrrolidone --.

Signed and Sealed this

Second Day of April, 2002

Attest:

Attesting Officer

JAMES E. ROGAN
*Director of the United States Patent and Trademark Office*